(12) United States Patent
Heiland et al.

(10) Patent No.: US 11,706,236 B2
(45) Date of Patent: *Jul. 18, 2023

(54) AUTONOMOUS APPLICATION OF SECURITY MEASURES TO IOT DEVICES

(71) Applicant: Rapid7, Inc., Boston, MA (US)

(72) Inventors: Deral Heiland, Xenia, OH (US); Dustin Myers, Alexandria, VA (US); Wah-Kwan Lin, Melrose, MA (US)

(73) Assignee: Rapid7, Inc., Boston, MA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/391,134

(22) Filed: Aug. 2, 2021

(65) Prior Publication Data

US 2021/0360406 A1 Nov. 18, 2021

Related U.S. Application Data

(63) Continuation of application No. 16/398,766, filed on Apr. 30, 2019, now Pat. No. 11,115,823.

(51) Int. Cl.
| | |
|---|---|
| *H04L 9/40* | (2022.01) |
| *H04L 41/28* | (2022.01) |
| *H04L 41/16* | (2022.01) |
| *H04W 4/70* | (2018.01) |
| *G06N 20/00* | (2019.01) |
| *H04W 12/122* | (2021.01) |
| *G06F 18/24* | (2023.01) |

(52) U.S. Cl.
CPC .......... *H04L 63/1425* (2013.01); *G06F 18/24* (2023.01); *G06N 20/00* (2019.01); *H04L 41/16* (2013.01); *H04L 41/28* (2013.01); *H04W 4/70* (2018.02); *H04W 12/122* (2021.01)

(58) Field of Classification Search
CPC .... H04W 12/122; H04W 4/70; G06K 9/6267; G06K 9/6256; G06K 9/6269; G06K 9/6282; G06N 20/00; G06N 5/003; G06N 20/10; H04L 41/16; H04L 41/28; H04L 63/1425; H04L 67/535; H04L 67/12; H04L 41/0853
See application file for complete search history.

(56) References Cited

U.S. PATENT DOCUMENTS

| | | | |
|---|---|---|---|
| 10,091,100 B1* | 10/2018 | Duerk | H04L 47/621 |
| 2014/0244834 A1* | 8/2014 | Guedalia | H04W 4/08 709/224 |
| 2019/0086988 A1* | 3/2019 | He | G06F 1/3215 |
| 2020/0211721 A1* | 7/2020 | Ochoa | H04L 41/145 |

FOREIGN PATENT DOCUMENTS

| | | |
|---|---|---|
| WO | 2020118376 A1 | 6/2020 |
| WO | WO-2020118376 A1 * | 6/2020 ........... G06K 9/6214 |

\* cited by examiner

*Primary Examiner* — Abiy Getachew
(74) *Attorney, Agent, or Firm* — Ashwin Anand

(57) ABSTRACT

Methods and systems for classifying a device on a network. The systems and methods may receive network activity data associated with an unknown device. A classifier executing one or more machine learning models may then classify the device as an internet of things (IoT) device or a non-IoT device.

20 Claims, 10 Drawing Sheets

– 1 –

AUTONOMOUS APPLICATION OF SECURITY MEASURES TO IOT DEVICES

CROSS-REFERENCE TO RELATED APPLICATIONS

This application is a continuation of U.S. patent application Ser. No. 16/398,766, filed Apr. 30, 2019, which is hereby incorporated by reference herein in its entirety.

TECHNICAL FIELD

Embodiments described herein generally relate to systems and methods for monitoring network activity and, more particularly but not exclusively, to systems and methods for classifying a network device as an internet-of-things (IoT) device or a non-IoT device.

BACKGROUND

Due to their prevalence in today's society, the internet and other types of networks have become a hub for criminal activity. Often times cyber-criminals or other threat actors attempt to install or otherwise deploy harmful applications on unprotected systems. Once a threat actor obtains access to a targeted system or device, they may perform further actions such as stealing data, escalating their privileges, or the like.

Regarding network configurations and devices thereon, IoT devices have become increasingly common over the past several years as more and more aspects of daily life have become digitized and interconnected. IoT devices are generally less secure than non-IoT devices, as IoT devices are generally cheap to produce and security is often overlooked. Accordingly, threat actors may first target IoT devices on a network to gain access to other devices on the network or otherwise perform malicious activity on the network.

A need exists, therefore, for systems and methods for classifying network devices as IoT devices or as non-IoT devices.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for classifying a device on a network. The method includes receiving network activity data associated with a device on a network, extracting at least one feature from the network activity data associated with the device on the network, providing the at least one extracted feature as input to a classifier executing a machine learning model configured to classify the device as an internet-of-things (IoT) device or a non-IoT device based on the at least one extracted feature, and receiving a label indicating that the device is an IoT device or a non-IoT device from the classifier executing the machine learning model.

In some embodiments, the method further includes training the machine learning model based on network activity data associated with at least one training device labeled as an IoT device or a non-IoT device. In some embodiments, the method further includes extracting at least one training feature from the network activity data associated with the at least one training device, wherein the machine learning model is trained based on the at least one extracted training feature. In some embodiments, the method further includes performing at least one feature engineering technique to enhance the at least one extracted training feature prior to training the machine learning model.

In some embodiments, the at least one feature includes at least one of connection history of the device, duration of a device connection, ports used by the device, timestamps of connections made by the device, connection states of the device, number of packets communicated to or from the device, bytes transmitted to or from the device, source IP address of connection involving the device, destination IP address of a connection involving the device, and services utilized by the device.

In some embodiments, the method further includes, upon receiving a label indicating that the device is an IoT device, elevating the IoT device to a watch list for further monitoring. In some embodiments, the method further includes detecting anomalous network activity associated with the IoT device and issuing an alert using a user interface upon detecting the anomalous activity associated with the IoT device.

In some embodiments, the method further includes updating the machine learning model with the received label.

According to another aspect, embodiments relate to a system for classifying a device on a network. The system includes an interface for receiving network activity data associated with a device on a network, and a processor executing instructions stored on memory to provide: a feature extraction module configured to extract at least one feature related to the network activity data associated with the device on the network; and a classifier executing a machine learning model configured to receive the at least one extracted feature as input and provide a label indicating that the device is an internet-of-things (IoT) device or a non-IoT device.

In some embodiments, the machine learning model is trained based on network activity data associated with at least one training device labeled as an IoT device or a non-IoT device. In some embodiments, the feature extraction module is configured to extract at least one training feature from the network activity data associated with the at least one training device, wherein the machine learning model is trained based on the at least one extracted training feature. In some embodiments, the classifier is further configured to perform at least one feature engineering technique to enhance the at least one extracted training feature prior to training the machine learning model.

In some embodiments, the at least one feature includes at least one of connection history of the device, duration of a device connection, ports used by the device, timestamps of connections made by the device, connection states of the device, number of packets communicated to or from the device, bytes transmitted to or from the device, source IP address of connection involving the device, destination IP address of a connection involving the device, and services utilized by the device.

In some embodiments, the processor is further configured to, upon the classifier providing a label indicating that the device is an IoT device, elevate the IoT device to a watch list for further monitoring. In some embodiments, the processor is further configured to detect anomalous network activity associated with the IoT device and issue an alert using a user interface upon detecting the anomalous activity associated with the IoT device.

In some embodiments, the classifier is further configured to update the machine learning model with the provided label indicating that the device is an IoT device or a non-IoT device.

According to yet another aspect, embodiments relate to a method for training an internet of things (IoT) device classifier. The method includes deploying at least one labeled IoT device in a network environment, deploying at least one labeled non-IoT device in the network environment, receiving network activity data associated with each of the IoT device and the non-IoT device, extracting at least one feature related to the network activity data associated with each of the IoT device and the non-IoT device, providing the at least one extracted feature associated with each of the IoT device and the non-IoT device and the devices' label to a machine learning model, and training the machine learning model to, when executed by a classifier, classify an unlabeled device as an IoT device or a non-IoT device based on the at least one extracted feature associated with each of the IoT device and the non-IoT device and the devices' labels.

In some embodiments, the method further includes performing at least one feature engineering technique to enhance the at least one extracted feature prior to providing the extracted feature to the classifier for training.

In some embodiments, the method further includes providing network activity data regarding an unlabeled device to the machine learning model and receiving from the machine learning model a classification of the unlabeled device as an IoT device or a non-IoT device. In some embodiments, the method further includes retraining the machine learning model based on the classification of the unlabeled device as IoT device or a non-IoT device.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
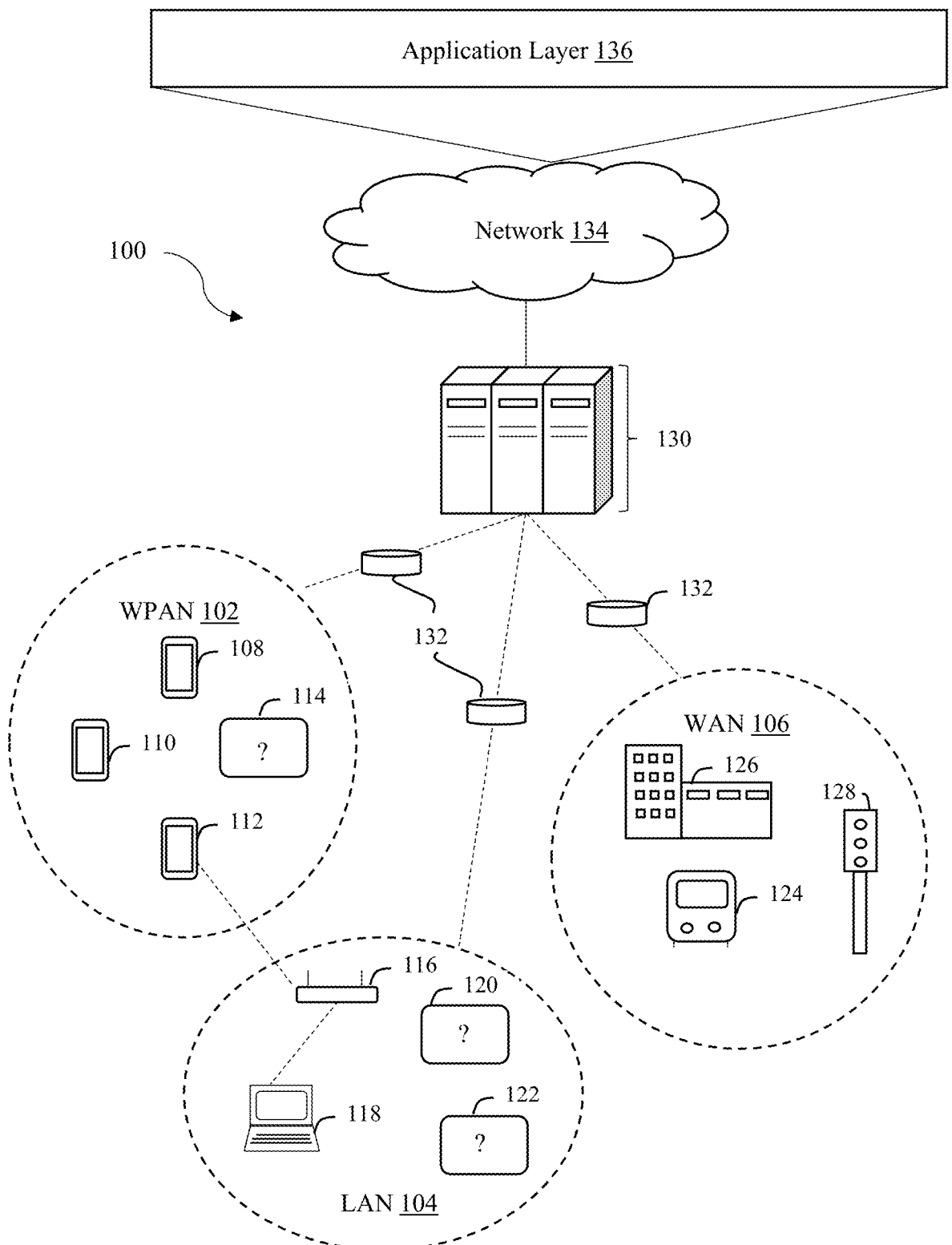
FIG. 1 illustrates various types of networks that include IoT and non-IoT devices in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods described herein provide novel techniques for classifying network devices as IoT devices or non-IoT devices. In the context of the present application, the term "IoT device" may refer to physical devices configured with internet connectivity, excluding conventional computers such as laptops or PCs. These IoT devices include, but are not limited to, security cameras, thermostats, healthcare-related devices, printers, smart TVs, refrigerators, lights, smartphones, voice-command devices, humidity control devices, appliances, wearable technologies, fitness monitoring devices, vehicles, traffic monitoring systems, transportation systems, or the like. This list is merely exemplary, and other types of IoT devices whether available now or invented hereafter may be identified in accordance with the various embodiments described herein.

It may be desirable to identify IoT devices for at least two reasons. First, IoT devices are generally configured and operated differently than conventional, non-IoT devices (e.g., hosts, laptops, PCs, routers, switches, hubs, or the like). Specifically, IoT devices are generally less secure than these conventional devices. A threat actor aiming to gain access to a network or some device thereon may therefore first target an IoT device in the hope of obtaining further access to other devices on the network.

Second, IoT devices are generally unmanaged and are generally not subject to the same level of control, oversight, or maintenance as non-IoT devices. Specifically, these devices are generally not subject to the same security controls, maintenance policies, updates, or other type of attention generally afforded to conventional network devices on a network. In fact, many times the software and firmware on IoT devices do not even follow the most basic of secure coding practices.

This is often because security personnel are simply unaware these devices have joined a network. For example, IoT devices such as a Raspberry Pi® computer can be, unbeknownst to security personnel, introduced to a corporate network through an Ethernet connection. Once properly identified and labeled, however, security personnel may provide any appropriate security updates or actions to monitor and manage the IoT devices as with other devices on the network.

Until then, the unmanaged IoT devices may be used to conduct activity that remains unknown to network administrators. Similarly, the unmanaged IoT devices may be the subject of attacks (e.g., to gain access to other portions of the network as discussed above) that may remain undetected.

The systems and methods described herein therefore provide novel techniques for identifying whether an unknown device on a network is an IoT device. Specifically, the systems and methods described herein classify network devices as either IoT devices or non-IoT devices. Once this classification is made, network personnel or network monitoring tools may autonomously elevate identified IoT devices for further monitoring or analysis.

The systems and methods described herein first train one or more supervised machine learning procedures to be executed by a classifier. This may first involve deploying one or more known, labeled IoT devices on a network. These devices may be associated in a database with "IoT" labels along with features such as their location and/or IP address.

Presumably, there will already be other devices on the network that are most likely non-IoT devices. These devices may be specifically labeled or tagged as "non-IoT" devices. Accordingly, the labeled IoT devices and non-IoT devices provide a computing environment to monitor activity involving the IoT devices as well as the non-IoT devices as part of a training phase.

During the training phase, the systems and methods described herein may monitor activity (e.g., network traffic) associated with at least the IoT devices. This monitoring phase may be followed by training one or more machine learning models using the monitored activity to identify patterns or characteristics associated with IoT devices.

The trained models may then be applied to unknown devices on a network (i.e., devices that are not labeled as an IoT device or a non-IoT device). The classifiers may identify IoT devices based on their activity matching one or more identified or otherwise learned patterns.

Once IoT devices are identified, the systems and methods described herein may then issue one or more alerts to inform a user (e.g., network security personnel) that an IoT device is present on the network. The user may then perform any appropriate measures such as tagging the device with an IoT label (if not tagged automatically), elevating the detected IoT device for further analysis, isolating the IoT device, blocking the IoT device from the network, or performing any other appropriate measures. Additionally or alternatively, these measures may be implemented autonomously.

FIG. 1 illustrates an exemplary IoT architecture 100 in accordance with one embodiment. The architecture 100 may include or otherwise be in operable communication with different types of networks such as a wireless personal area network (WPAN) 102, a local area network (LAN) 104, and a wide area network (WAN) 106. Each of these types of networks may include or otherwise be in communication with various devices or systems. The WPAN 102 may include devices such as smartphones 108, 110, 112, as well as an unknown device 114. The LAN 104 may include devices such as wireless routers 116, laptops 118, and unknown devices 120 and 122. The WAN 106 may include or otherwise be in communication with service systems relating to transportation 124, manufacturing 126, and traffic monitoring 128.

The networks 102, 104, and 106 may be connected to one or more servers 130 via routers 132. Data gathered by the networks 102, 104, 106 may be communicated over a network 134 such as the internet to an application layer 136 for further processing, analysis, etc.

Figure 2:
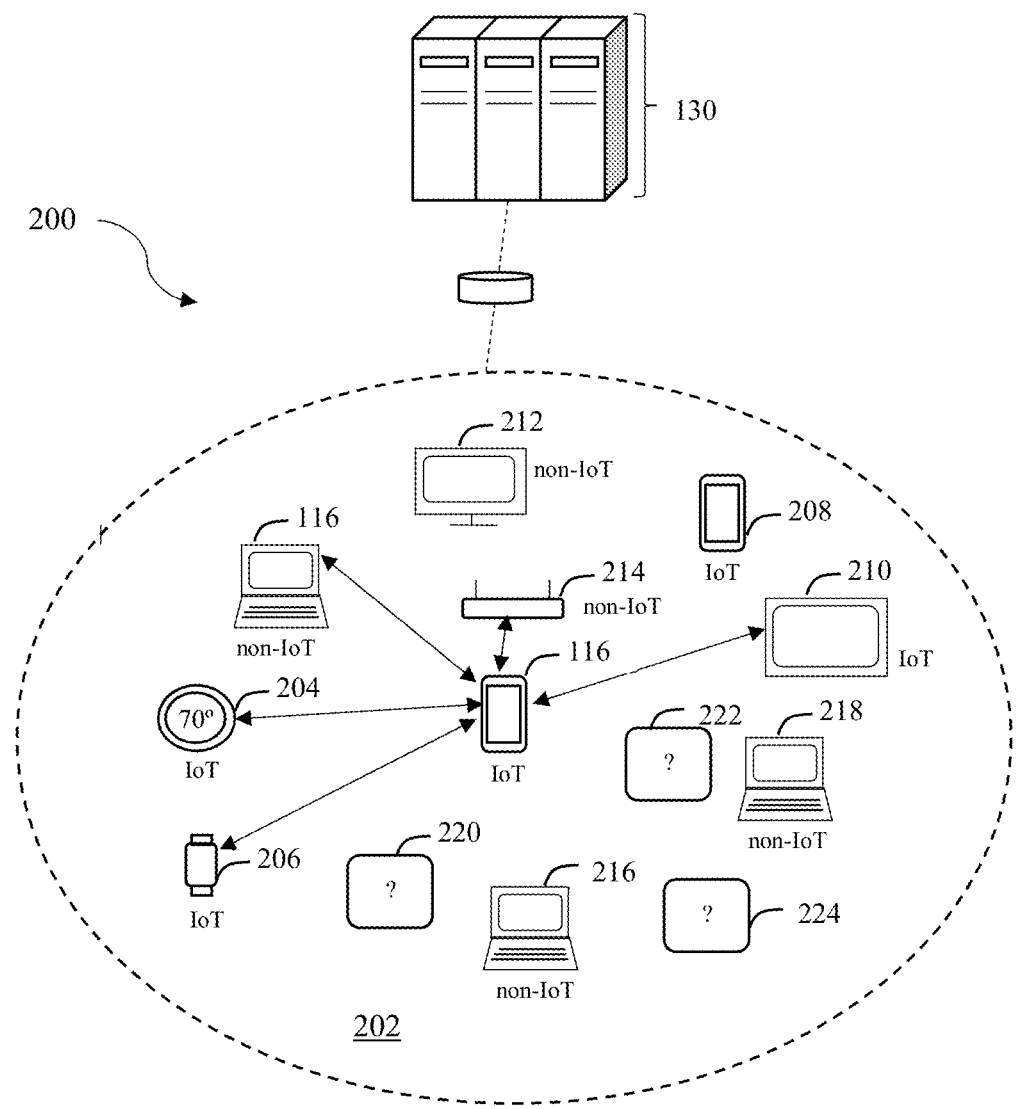
FIG. 2 illustrates a network including unknown devices in accordance with one embodiment.

FIG. 2 illustrates a network architecture 200 including labeled IoT devices and labeled non-IoT devices in accordance with one embodiment. The network architecture 200 of FIG. 2 may include components similar to those shown in FIG. 1.

However, in FIG. 2, the various components of the network 202 are explicitly tagged or otherwise labeled as IoT devices or non-IoT devices. Labeled IoT devices may include, but are not limited to, thermostats 204, smartwatches 206, smartphones 208, smart TVs 210, or the like. Labeled non-IoT devices may include a PC 212, wireless router 214, and laptops 216 and 218. The network 202 also includes one or more unknown devices 220, 222, and 224.

Figure 3:
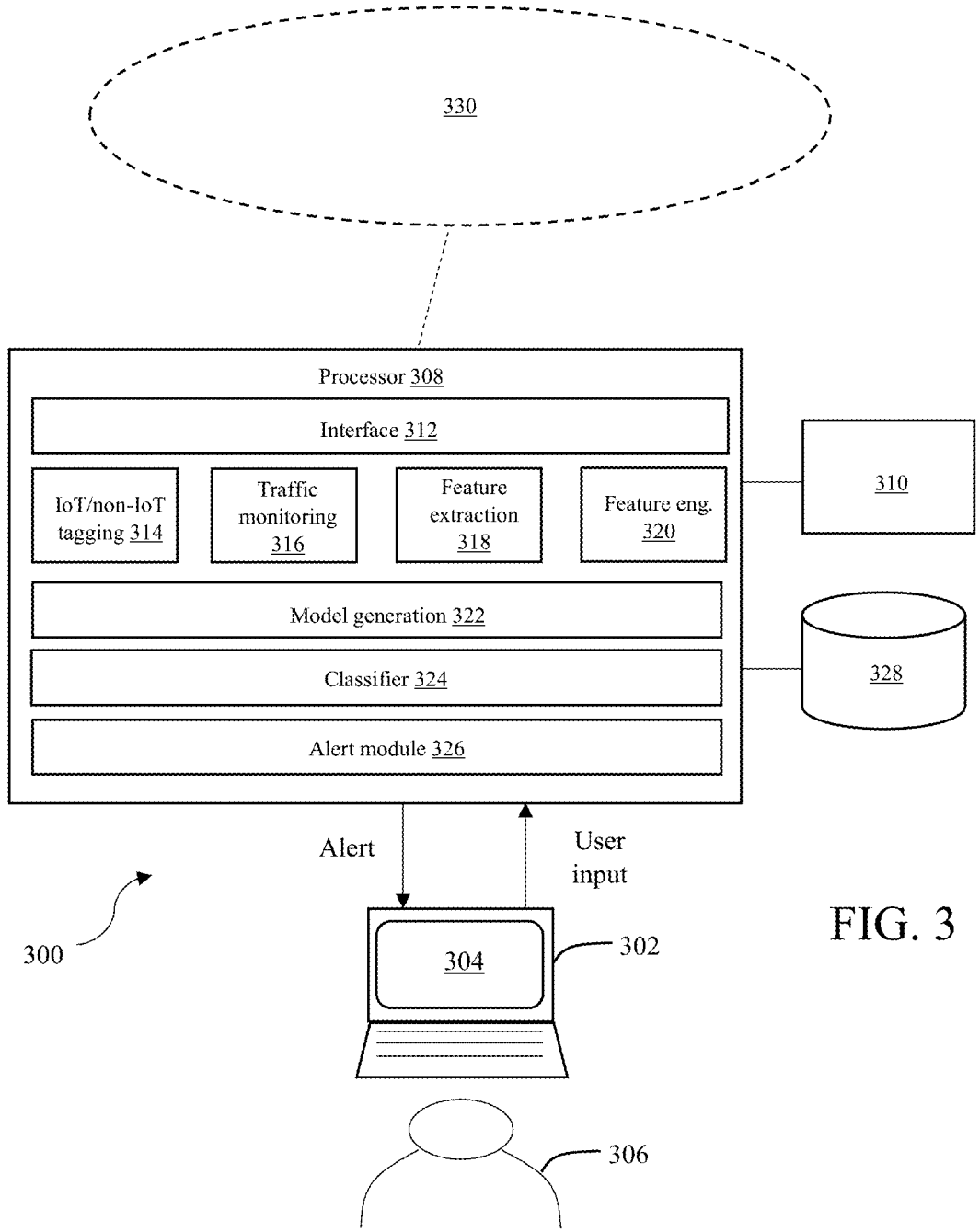
FIG. 3 illustrates a system for classifying a device on a network in accordance with one embodiment.

FIG. 3 illustrates a system 300 for classifying a device on a network in accordance with one embodiment. The system 300 may include a user device 302 executing a user interface 304 for presentation to one or more users 306 such as security personnel or other users interested in determining which devices on a network are IoT devices.

The user device 302 may be any hardware device capable of executing the user interface 304. The user device 302 may be configured as a laptop, PC, tablet, mobile device, or the like. The exact configuration of the user device 302 may vary as long as it can execute and present the user interface 304 to the user 306.

The user device 302 may be in operable communication with one or more processors 308. The processor(s) 308 may be any hardware device capable of executing instructions stored on memory 310 to accomplish the objectives of the various embodiments described herein. The processor 308 may be a microprocessor, a field programmable gate array (FPGA), an application-specific integrated circuit (ASIC), or other similar device whether available now or invented hereafter.

In some embodiments, such as those relying on one or more ASICs, the functionality described as being provided in part via software may instead be configured into the design of the ASICs and, as such, the associated software may be omitted. The processor(s) 308 may be configured as part of the user device 302 on which the user interface 304 executes, such as a laptop, or may be located at some remote location.

The processor 308 may execute instructions stored on memory 310 to provide various modules to accomplish the objectives of the various embodiments described herein. Specifically, the processor 308 may execute or otherwise include an interface 312, an IoT/non-IoT tagging module 314, a traffic monitoring module 316, a feature extraction module 318, a feature engineering module 320, a model generation module 322, a classifier 324, and an alert module 326.

The memory 310 may be L1, L2, L3 cache or RAM memory configurations. The memory 310 may include non-volatile memory such as flash memory, EPROM, EEPROM, ROM, and PROM, or volatile memory such as static or dynamic RAM, as discussed above. The exact configuration/type of memory 310 may of course vary as long as instructions for classifying devices can be executed by the processor 308 to accomplish the objectives of various embodiments described herein.

One or more databases 328 may store various types of data relevant in classifying network devices. This data may include, but is not limited to, data regarding which devices on a network are IoT devices, which devices are non-IoT devices, locations of devices, specific features or characteristics of devices, or the like.

As seen in FIG. 3, the processor 308 is in operable communication with one or more networks 330 such as the network 202 of FIG. 2. The network(s) 330 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 330 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link. The exact configuration of the network(s) 330 may vary as long as the network(s) 330 can support IoT functionality.

In operation, the user 306 may first deploy or otherwise introduce IoT devices onto the network 330. These introduced IoT devices may be similar to those illustrated as part of network 202 of FIG. 2, for example. The user 306 may also note or otherwise receive data regarding the IoT devices such as their type, location, user access permissions, or any other type of data useful in accomplishing the features of the systems and methods described herein.

There may already be non-IoT devices on the network 330 as well. These non-IoT devices may be similar to the non-IoT devices of the network 202 of FIG. 2, for example. Accordingly, the network 330 may include a plurality of labeled IoT devices and labeled non-IoT devices. The user 306 may use the IoT/non-IoT tagging module 314 to explicitly label devices known to be either IoT devices or non-IoT devices.

Once one or more IoT devices are on the network 330, the traffic monitoring module 316 may monitor activity associated with at least the IoT devices. The traffic monitoring module 316 may also monitor activity associated with the non-IoT devices.

Specifically, the traffic monitoring module 316 may collect high-level network metadata regarding connections on the network 330. This is opposed to more detailed data such as packet content captured through packet capture tools (e.g., pcap). Packet data is generally large, detailed, computationally expensive, and slow to analyze.

For example, the traffic monitoring module 316 may collect a number of features related to network activity including, but not limited to, source IP address of a connection, destination IP address of a connection, connection history associated with a device, duration of a connection involving a device, ports used, timestamps of connections involving a device, packet counts to or from a device, bytes transmitted to or from device, and services utilized by a device. By focusing on these features, which oftentimes contain the most relevant segments of data for network traffic sourcing, the embodiments described herein do not require much memory and are computationally efficient.

The gathered data may be stored in the one or more databases 328 and/or passed along to other components of the processor 308 for further analysis or processing. In the database(s) 328, the collected data may be tagged or otherwise associated with its device label.

The collected data regarding the network activity essentially acts a training set that can be communicated to the model generation module 322 to train one or more machine learning models to distinguish between IoT devices and non-IoT devices.

Before the gathered data is communicated to the model generation module 322, however, the feature engineering module 320 may perform any appropriate feature engineering process(es). These feature engineering processes or techniques may involve applying domain knowledge to recognize the significance of certain data, cleansing raw data of elements that might impair model accuracy, aggregating the data with any additional data sources that may be useful, or any other applicable data processing or engineering technique.

For example, these feature engineering steps may remove data such as loopback information, which would not be helpful in training a machine learning model. As another example, the featuring engineering module 320 may select data only pertaining to a certain time window for analysis.

As another example, the feature engineering module 320 may select only data pertaining to certain types of IoT devices such as printers. Similarly, the feature engineering module 320 may specify (e.g., at the instruction of the user 306) to only consider activity involving Epson® printers. Devices associated with certain internet protocol (IP) addresses may also be more important and weighed more heavily than others, such as if a device had an IP address that is known to be associated with a certain company or entity.

The user 306 may enter instructions specifying which types of devices are to be considered, over what time span, on what days of the week, etc. Similarly, the user 306 may instruct the traffic monitoring module 316 to only gather activity data associated with certain devices or at certain times as well.

As another example, the feature engineering module 320 may only analyze connections in which the amount of data transferred satisfies some condition such as a minimum size threshold. This may ensure that only "meaningful" connections are considered in training the model(s).

The feature engineering module 320 may also aggregate or supplement the analyzed data with historical data stored in the database(s) 328. For example, activity data regarding a Nest® security camera may be supplemented with a larger set of historical data gathered from these types of security cameras.

In addition to or in lieu of selecting certain data or aggregating data with a historical set, the feature engineering module 320 perform any appropriate calculations. For example, for a given set of data, the feature engineering module 320 may calculate the standard deviation, mean, median, weighted averages, or the like.

The user 306 may also have the opportunity to perform any appropriate feature engineering steps as well. For example, the user 306 may select only a portion of the engineered data for further analysis based on his or her goals, preferences, etc.

The model generation module 322 may receive the engineered data, along with an indication of whether each device associated with the data is an IoT device or a non-IoT device. The model generation module 322 may then build one or more models to be used by the classifier 324 to classify unlabeled network devices as IoT devices or non-IoT devices.

Figure 4:
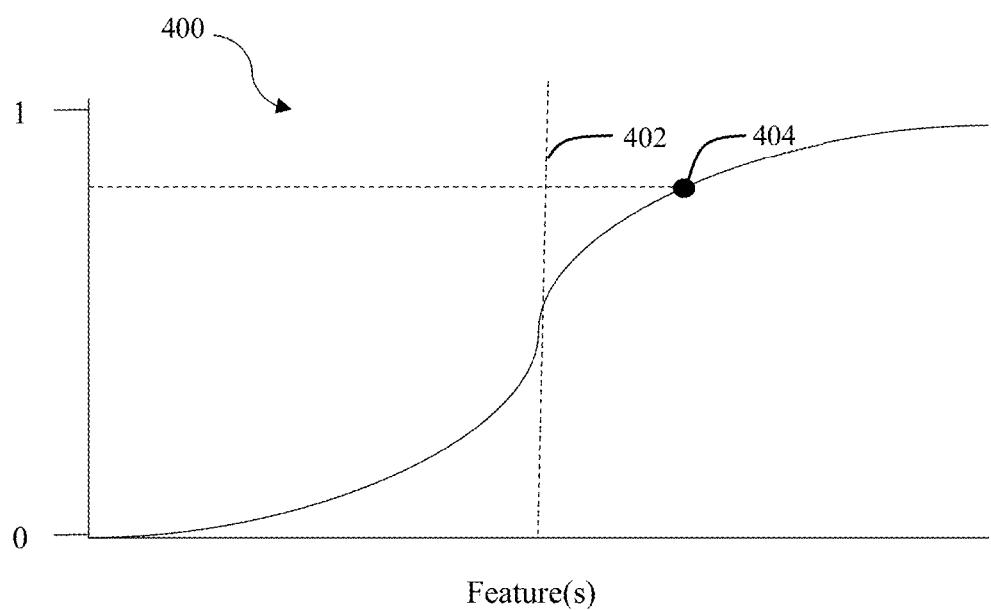
FIG. 4 illustrates a logistic regression machine learning model in accordance with one embodiment.

In some embodiments, the model generation module 322 may generate a logistic regression machine learning model. FIG. 4 illustrates a logistic regression curve 400 (i.e., a sigmoid function) in accordance with one embodiment. The y axis comprises a binary classifier with a value of zero (corresponding to a non-IoT device) and one (corresponding to an IoT device). That is, if the logistic regression model predicted a value of 1 for a particular device, the device would be classified as an IoT device.

More specifically, the sigmoid function may represent the probability that a particular device, based on an associated feature or features on the x axis, is an IoT device. The x axis may correspond to some type of feature(s) associated with the unlabeled device under analysis that are indicative of whether the device is an IoT device, such as the volume of traffic to and/or from the device. The feature(s) of the x axis may represent one or more of various features related to network activity such that the larger the magnitude of the feature or the more features present, the more likely the associated device is an IoT device.

A user such as the user 306 may specify some decision boundary 402 such that any device 404 with certain feature(s) that place the device 404 to the right of the boundary 402 has a higher probability of being an IoT device than being a non-IoT device. Accordingly, the classifier 324 would classify this device 404 as an IoT device. Any device with features that place the device on or to the left of the decision boundary 402 has a higher probability of being a non-IoT device, and would therefore be classified as a non-IoT device.

Essentially the sigmoid function represents the probability p that a given device, based on its associated feature(s), is an IoT device. Devices to the right of the decision boundary 402 have a higher probability of being an IoT device than a non-IoT device, and are therefore classified as an IoT device.

Figure 5A:
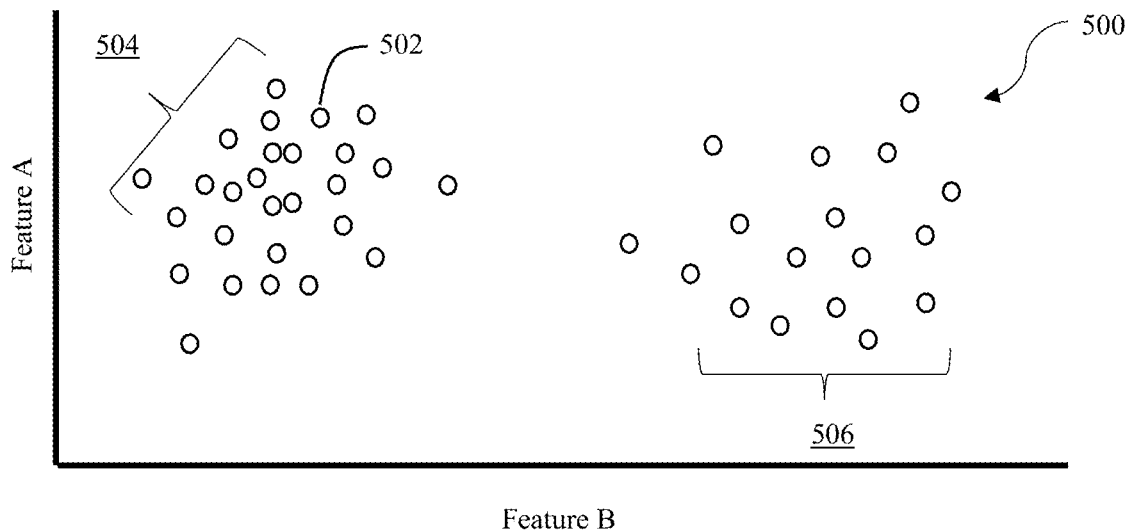
FIGS. 5A-C illustrate a support vector machine (SVM) classifier in accordance with one embodiment.

In addition to or in lieu of generating a logistic regression model, the model generation module 322 may generate a support vector machine (SVM) model for use by the classifier 324 in classifying unlabeled devices. FIG. 5A, for example, illustrates an SVM plot 500 in accordance with one embodiment. The plot 500 illustrates a plurality of support vectors 502 (illustrated as circles) representing network devices that are either labeled as non-IoT devices in group 504 (on the left side of the plot 500) or IoT devices in group 506 (on the right side of the plot 500).

Figure 5B:
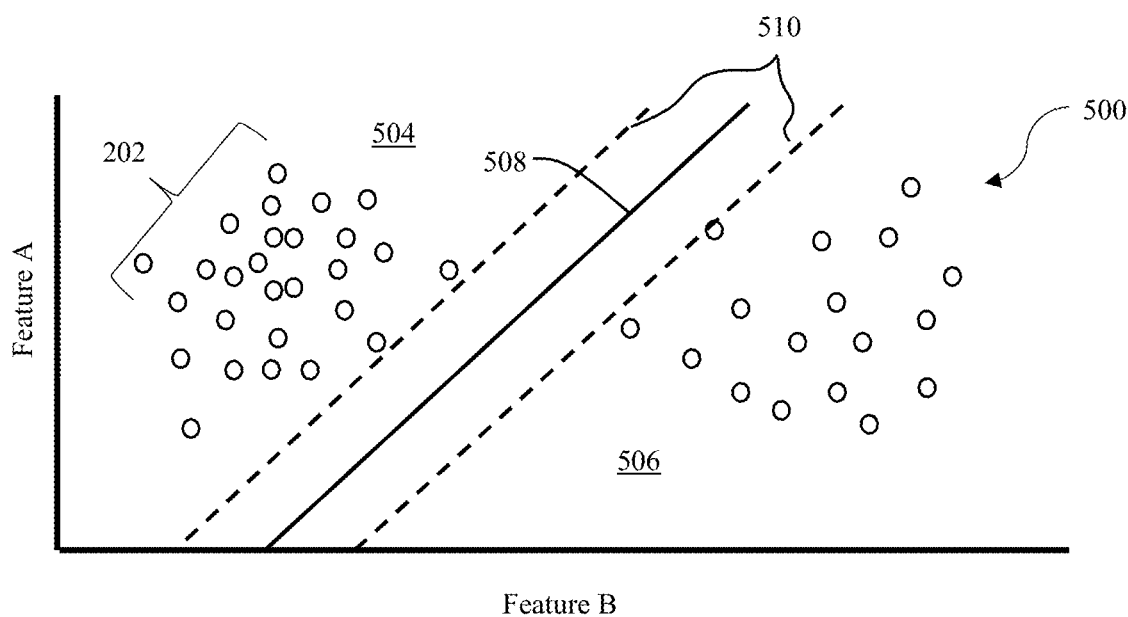

The model generation module 322 may determine an appropriate decision boundary such that unlabeled devices falling on the left side of the boundary will be labeled as non-IoT devices and devices falling on the right side of the boundary will be labeled as IoT devices. FIG. 5B illustrates a generated decision boundary 508 with optimized margins 510. Through support vector machine training techniques, the optimal plane (i.e., the decision boundary 508) can be discovered such that the margins 510 are as large as possible given a set of one or more features A and B.

Features A and B may relate to some characteristics or features related to activity data associated with labeled IoT devices and labeled non-IoT devices. These features may include any one or more of those gathered by the traffic monitoring module 316 discussed previously. Devices represented by support vectors 502 classified in IoT group 506 (i.e., devices on the right side of the decision boundary 508) may possess some feature or combination of features that the devices represented by support vectors 502 in group 504 do not.

Figure 5C:
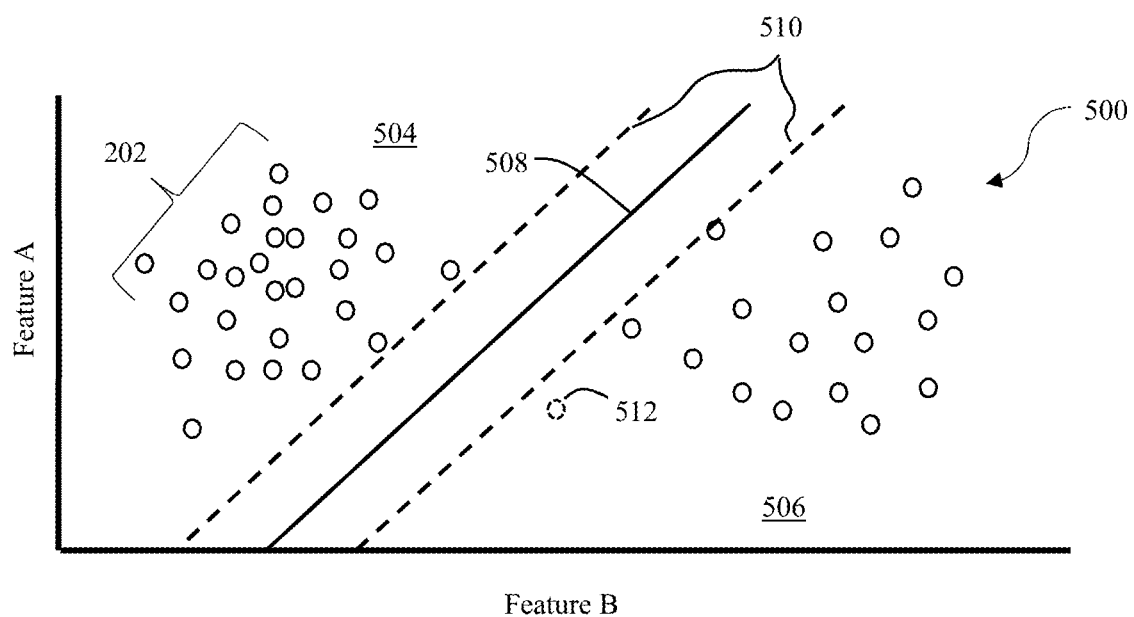

The membership of an unlabeled device in group 504 or 506 may depend on whether the unlabeled device possesses or otherwise has the characteristics or features on which the SVM model was trained. For example, FIG. 5C illustrates the introduction of a new support vector 512 corresponding to a new, unlabeled device on a network. Although this device is unlabeled, its detected features result in its placement on the right side of the decision boundary 508. Accordingly, the classifier 324 would classify the new device as an IoT device.

Figure 6:
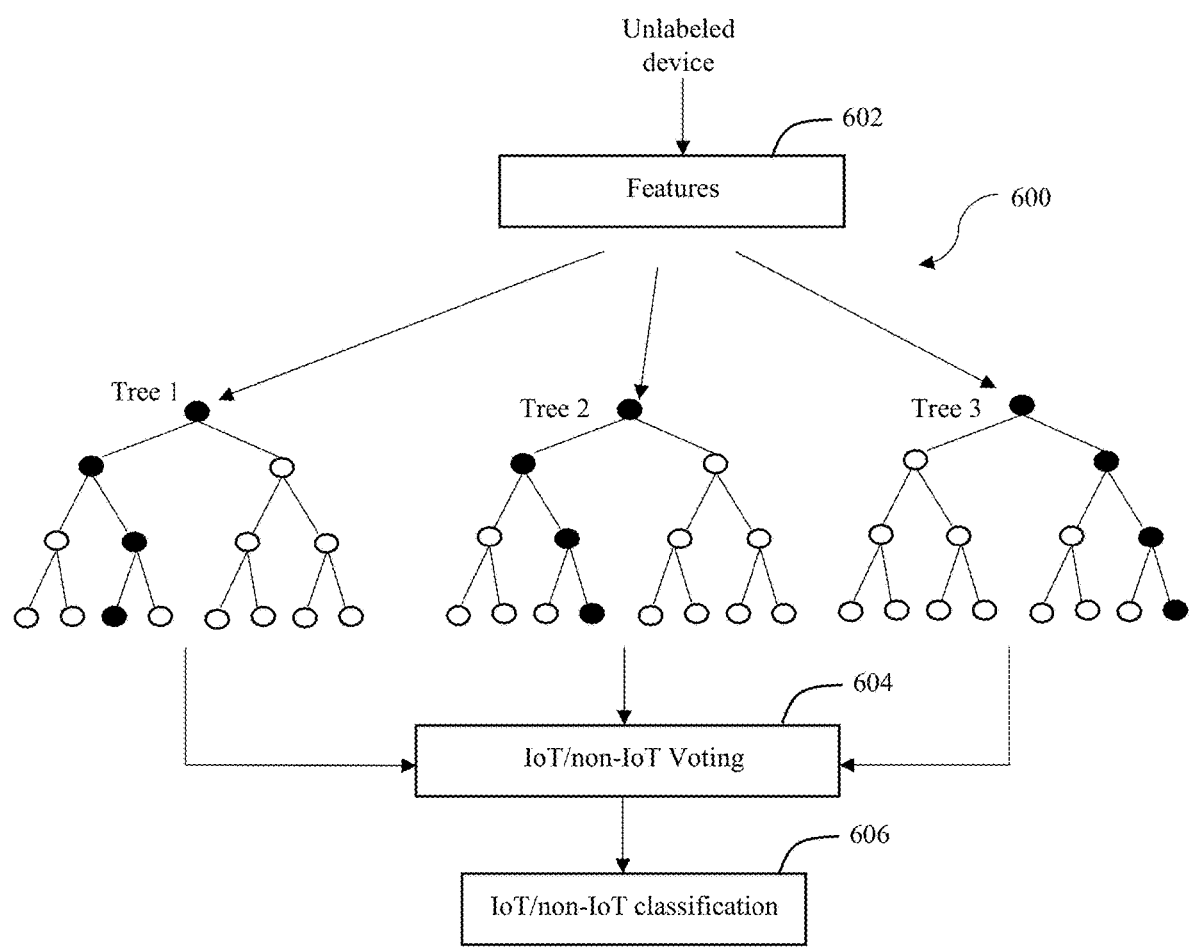
FIG. 6 illustrates a random forest classifier in accordance with one embodiment.

As yet another example, the model generation module 322 may generate a random forest-based machine learning model for execution by the classifier 324. For example, FIG. 6 illustrates a random forest classifier 600 that receives as input features 602 related to an unlabeled device. The random forest classifier 600 may include a plurality of trees that are each configured to detect whether some feature(s) are present or are otherwise associated with the unlabeled device.

For example, tree 1 may first consider whether the unlabeled device has made a connection to a particular IP address. If so, the classifier 600 may traverse a certain branch of the tree, which may then consider whether some other feature is present. Certain nodes of trees 1, 2, and 3, are darkened indicating the presence or absence of some particular feature. Although only three trees are illustrated in FIG. 6, any number of trees may be used to consider any number of features.

Each tree may output a classification decision regarding whether the device is an IoT device. These outputs are based on the presence or absence of certain features, represented by darkened nodes in trees 1, 2, and 3.

The classification decisions of the trees are combined in step 604, and an IoT/non-IoT classification is provided in step 606. A device may be classified as an IoT device if, for example, the majority of trees output a classification decision in step 604 that the device is an IoT device. Accordingly, the classification decisions output by the trees need not be unanimous in order for their classification decision to be the ultimate classification of a device.

Regardless of the type of model used, the classifier 324 may output a label identifying a new device as an IoT device or a non-IoT device. As discussed previously, IoT devices are generally less secure and not subject to the same oversight, control, or maintenance as non-IoT devices. Accordingly, the alert module 326 may issue one or more alerts to a user 306 via the user interface 304. The alerts may be visual-based alerts, audio-based alerts, text-based alerts, haptic-based alerts, or some combination thereof.

Upon receiving an alert, the user 306 may be inclined to inspect the newly-identified IoT device or perform some other security or control measure(s). For example, the user 306 may ban the IoT device from the network, isolate the IoT device, set certain limits on the IoT device's activity (e.g., the amount of data it may send), or the like. If these limits are exceeded, or the IoT device is otherwise acting anomalous, the user 306 may be alerted as well. Additionally or alternatively, these security and control measures may be implemented autonomously by the processor 308 or something device or system.

As another example, the user 306 or the processor 308 may identify unexpected appearances or changes in IoT-sourced network activity. Similarly, the user 306 may make varied assessments on the proportional balance of IoT and non-IoT connection frequencies, as well as data transmission volumes associated with IoT devices.

Figure 7:
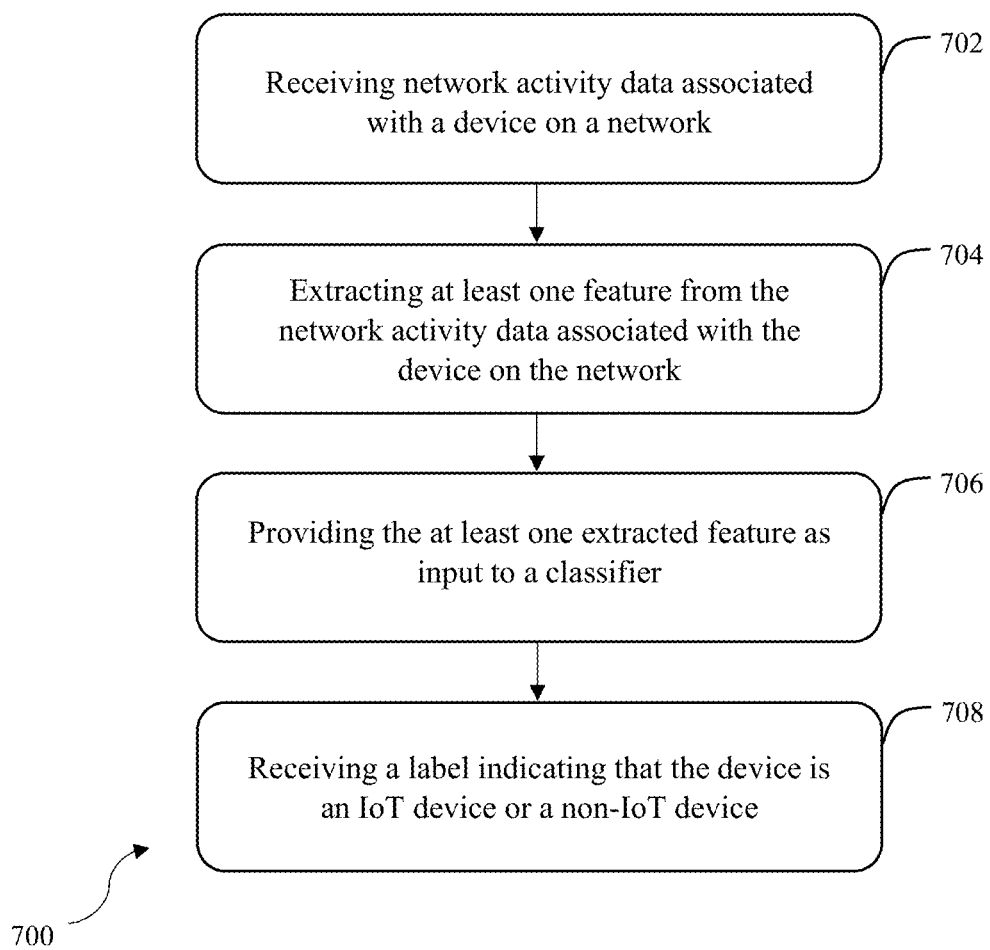
FIG. 7 depicts a flowchart of a method for classifying a device on a network in accordance with one embodiment.

FIG. 7 depicts a flowchart of a method 700 for classifying a device in accordance with one embodiment. Step 702 involves receiving network activity data associated with a device on a network. This device is unlabeled in that it is unknown whether the device is an IoT device or a non-IoT device. This data may be received continuously in real time, at predetermined intervals, when requested by a user, or the like.

Step 704 involves extracting at least one feature from the network activity data associated with the device on the network. The feature(s) may relate to the operation of the device and provide insight regarding whether the device is an IoT device or a non-IoT device. The extracted feature may include at least one of connection history of the device, duration of a device connection, ports used by the device, timestamps of connections made by the device, connection states of the device, number of packets communicated to or from the device, bytes transmitted to or from the device, source IP address of connection involving the device, destination IP address of a connection involving the device, and services utilized by the device, or the like.

Step 706 involves providing the at least one extracted feature as input to a classifier executing a machine learning model configured to classify the device as an internet-of-things (IoT) device or a non-IoT device based on the at least one extracted feature. The classifier may execute one or more machine learning models such as logistic regression-based models, SVM-based models, random forest-based models, or the like. These models may be trained on activity data associated with at least labeled IoT devices as discussed previously.

Step 708 involves receiving a label indicating that the device is an IoT device or a non-IoT device from the classifier executing the machine learning model. The classifier may execute one or more machine learning models on the features associated with the network activity data of the device. Based on the feature(s), the classifier may output a label classifying the device as an IoT device or a non-IoT device.

This label may be presented to a user such as security personnel informing them that an IoT device has been identified on a network. A user may then perform any appropriate measure such as elevating the IoT device for further monitoring or performing a security modification to make the IoT device at least more secure.

Figure 8:
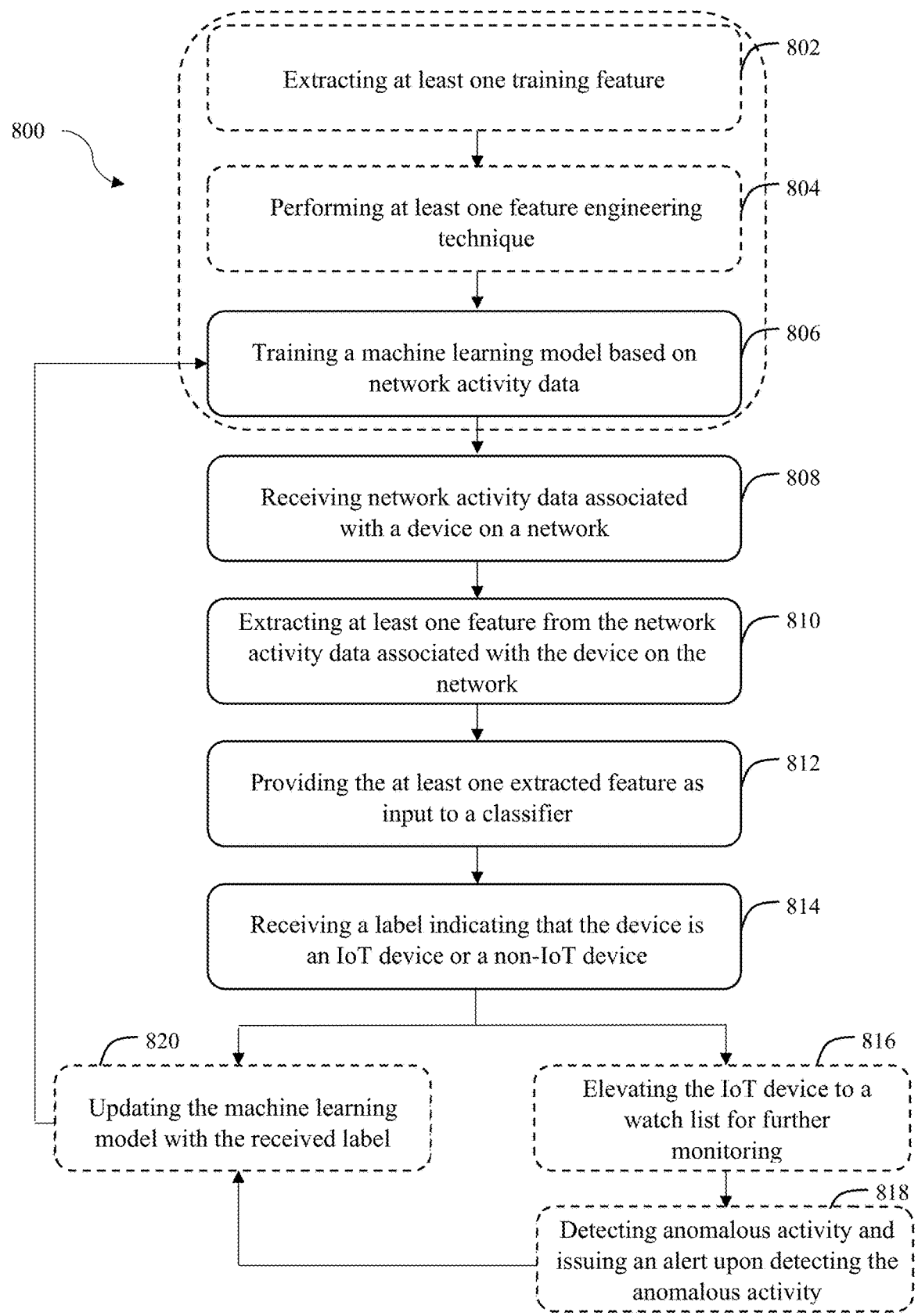
FIG. 8 depicts a flowchart of a method for classifying a device on a network in accordance with another embodiment.

FIG. 8 depicts a flowchart of a method 800 for classifying a device on a network in accordance with another embodiment. Steps 802, 804, and 806 (grouped in phantom) represent a training phase of method 800.

Step 802 involves extracting at least one training feature from network activity data associated with a training device. This training device may be a previously-labeled IoT device that was introduced onto a network and monitored for some period of time. Accordingly, step 802 involves extracting some feature related to the training device, wherein the extracted feature may be associated with the operation of IoT devices.

The extracted feature may include at least one of connection history of the device, duration of a device connection, ports used by the device, timestamps of connections made by the device, connection states of the device, number of packets communicated to or from the device, bytes transmitted to or from the device, source IP address of connection involving the device, destination IP address of a connection involving the device, and services utilized by the device. The extracted feature(s) may be used to train one or more machine learning models.

Step 804 involves performing at least one feature engineering technique to enhance the at least one extracted feature prior to training the machine learning model. The feature engineering technique(s) may involve applying some transformation to the extracted features such that the machine learning model(s) are trained on more accurate and useful data. The features may be combined with historical data to provide a more robust data set for training the machine learning model(s), for example. As discussed previously, the feature engineering technique(s) may also involve calculating various averages, standard deviations, filtering/removing certain data, etc.

Step 806 involves training a machine learning model based on the network activity data associated with the at least one training device. More specifically, the machine learning model may be trained on the extracted features from step 802 and, even more specifically, any engineered features.

The type of machine learning model(s) used may vary as long as they can accomplish the features of the various embodiments described herein. As discussed previously, the machine learning models used may include, but are not limited to, logistic regression-based models, SVM-based models, random forest-based models, or some combination thereof.

Steps 808, 810, 812, and 814 are similar to steps 702, 704, 706, and 708, respectively, of FIG. 7, the discussion of which is not repeated here. If the label received in step 814 indicates that the device is an IoT device, the method 800 may proceed to step 816.

Step 816 involves elevating the IoT device to a watch list for further monitoring. As discussed previously, IoT devices are generally less secure than conventional, non-IoT devices. Additionally, IoT devices are generally not subjected to the same amount of control, oversight, or maintenance as non-IoT devices.

Accordingly, it may be beneficial for users such as security personnel or network administrators to know when IoT devices join a network. Step 816 therefore involves elevating the IoT device to a watch list so that the IoT device will be monitored more closely. Additionally, users may define certain activity such that they are alerted when the IoT device is involved in the defined activity or when the IoT device is otherwise acting anomalous.

Step 818 involves detecting anomalous network activity associated with the IoT device. As IoT devices are generally less secure, users may want to monitor them and be notified of any anomalous activity. This anomalous activity may be specifically defined in step 816. For example, in some embodiments, a user may want to know whether an IoT device has connected to a certain IP address or has sent a large amount of data. The types of techniques for detecting anomalous activity, as well as the types of anomalous activity detected, may include those discussed in Applicant's co-pending U.S. patent application Ser. Nos. 16/202,217 and 16/202,282, both filed Nov. 28, 2018, the contents of each of which are hereby incorporated by reference as if set forth in their entirety herein.

Step 820 involves updating the machine learning model with the received label. Accordingly, the method 800 may continuously update and retrain the machine learning model(s) based on the newly-labeled IoT devices (and non-IoT devices). Although step 820 is illustrated as following step 818, step 820 may occur once a device has been labeled (i.e., without requiring steps 816 or 818 to be performed first).

Figure 9:
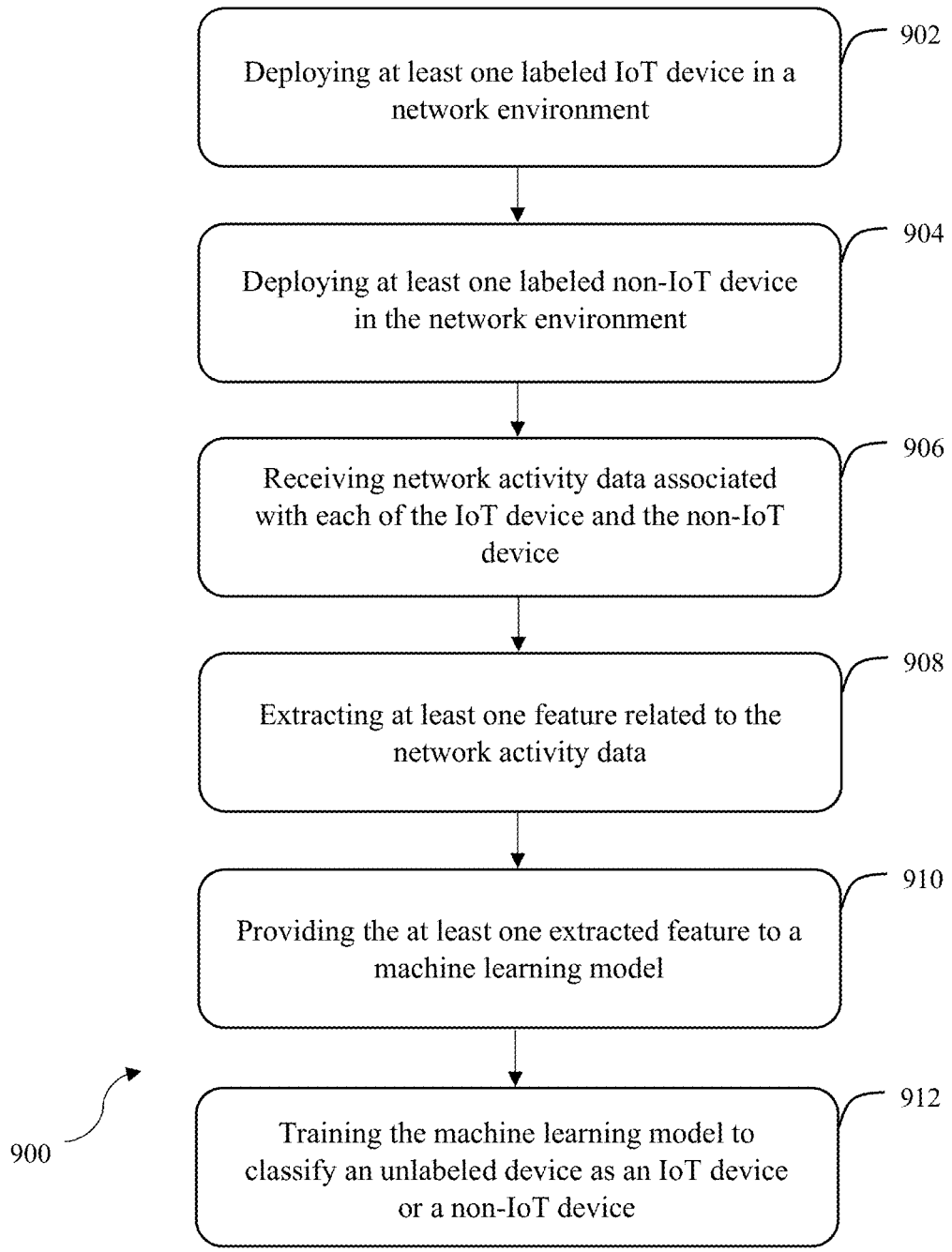
FIG. 9 depicts a flowchart of a method for training an internet of things (IoT) device classifier in accordance with one embodiment.

FIG. 9 depicts a flowchart of a method 900 for training an internet of things (IoT) device classifier in accordance with one embodiment. Step 902 involves deploying at least one labeled IoT device in a network environment. These may include any type of IoT device such as those described previously.

Step 904 involves deploying at least one labeled non-IoT device in the network environment. These may include any type of non-IoT devices such as those described previously.

Step 906 involves receiving network activity data associated with each of the IoT device and the non-IoT device. The IoT and non-IoT devices may be monitored for any period(s) of time, as long as the received data is sufficient to train at least one machine learning model to accomplish the features of the embodiments described herein.

Step 908 involves extracting at least one feature related to the network activity data associated with each of the IoT device and the non-IoT device. As in previous embodiments, the extracted feature(s) may include at least one of connection history of the device, duration of a device connection, ports used by the device, timestamps of connections made by the device, connection states of the device, number of packets communicated to or from the device, bytes transmitted to or from the device, source IP address of connection involving the device, destination IP address of a connection involving the device, and services utilized by the device. Accordingly, various relevant features related to the IoT and non-IoT devices can be extracted and used to train one or more machine learning models.

Step 910 involves providing the at least one extracted feature associated with each of the IoT device and the non-IoT device and the devices' labels to a machine learning model. As in previously-discussed embodiments, the machine learning model(s) may include logistic regression-based models, SVM-based models, random forest-based models, or some combination thereof.

Step 912 involves training the machine learning model to, when executed by a classifier, classify an unlabeled device as an IoT device or a non-IoT device based on the at least one extracted feature associated with each of the IoT device and the non-IoT device and the devices' labels. Once trained, the classifier can then accept new, unlabeled devices and provide a classification therefor.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
   performing, by one or more computing devices:
   receiving network activity data associated with a plurality of devices in a network, including a first device labeled as an Internet-of-Things (IoT) device and a second device labeled as a non-IoT device;
   extracting one or more features from the network activity data, wherein the one or more features are included in a training data set;
   providing the training data set including the one or more features as input to a machine learning model;
   training the machine learning model using the training data set to classify unlabeled devices as IoT or non-IoT devices;
   after the training, using the machine learning model to identify another device in the network as another IoT device; and
   in response to the identifying of the other IoT device;
   labeling the other IoT device with an IoT label, and autonomously applying one or more security measures to the other IoT device including banning the other IoT device from the network, isolating the other IoT device, or limiting data sent by the other IoT device.

2. The method of claim 1, further comprising the one or more computing devices performing a feature engineering technique to transform the one or more features prior to training the machine learning model.

3. The method of claim 2, wherein the feature engineering technique includes one or more of:
   calculating an average of an extracted feature,
   calculating a standard deviation of the extracted feature,
   filtering a portion of the network activity data, and
   combining the network activity data with historical data.

4. The method of claim 1, wherein the one or more features includes at least one of:
   connection history of a device,
   duration of a device connection,
   ports used by the device,
   timestamps of connections made by the device,
   connection states of the device,
   number of packets communicated to or from the device,
   bytes transmitted to or from the device,
   source IP address of connection involving the device,
   destination IP address of a connection involving the device, and
   one or more services utilized by the device.

5. The method of claim 1, wherein the machine learning model includes one or more of:
   a logistic regression model,
   a Support Vector Machine (SVM) model, and
   a random forest model.

6. The method of claim 1, further comprising the one or more computing devices performing:
   storing device data about the other IoT device in a database, wherein the device data indicates a classification of the other IoT device determined by the machine learning model.

7. The method of claim 1, further comprising the one or more computing devices performing:
   generating additional labels for additional devices in the network based on additional network activity data of the additional devices; and
   retraining the machine learning model using the additional labels and additional network activity data.

8. The method of claim 1, further comprising the one or more computing devices performing:
   generating additional labels for additional devices in the network based on additional network activity data of the additional devices; and
   retraining the machine learning model using the additional labels and additional network activity data.

9. The method of claim 1, further comprising the one or more computing devices performing:
   in response to the identifying of the other IoT device, elevating the other IoT device to a watch list for further monitoring.

10. The method of claim 6 further comprising the one or more computing devices performing:
  detecting anomalous network activity associated with the other IoT device; and
  issuing an alert using a user interface upon detecting the anomalous activity associated with the other IoT device.

11. A system comprising:
  one or more computing devices configured to:
  receive network activity data associated with a plurality of devices in a network, including a first device labeled as an Internet-of-Things (IoT) device and a second device labeled as a non-IoT device;
  extract one or more features from the network activity data, wherein the one or more features are included in a training data set;
  provide the training data set including the one or more features as input to a machine learning model;
  train the machine learning model using the training data set to classify unlabeled devices as IoT or non-IoT devices;
  after the training, use the machine learning model to identify another device in the network as another IoT device; and
  in response to the identifying of the other IoT device;
    label the other IoT device with an IoT label, and autonomously apply one or more security measures to the other IoT device including banning the other IoT device from the network, isolating the other IoT device, or limiting data sent by the other IoT device.

12. The system of claim 11, wherein the one or more computing devices are configured to:
  monitor the network over one or more wide area networks (WANs); and
  collect the network activity data from the network over the one or more WANs.

13. The system of claim 11, wherein the one or more computing devices are configured to:
  perform a feature engineering technique to transform the one or more features prior to training the machine learning model.

14. The system of claim 13, wherein to perform the feature engineering technique, the one or more computing devise is configured to:
  calculate an average of an extracted feature,
  calculate a standard deviation of the extracted feature,
  filter a portion of the network activity data, or
  combine the network activity data with historical data.

15. The system of claim 11, wherein the one or more features includes at least one of:
  connection history of a device,
  duration of a device connection,
  ports used by the device,
  timestamps of connections made by the device,
  connection states of the device,
  number of packets communicated to or from the device,
  bytes transmitted to or from the device,
  source IP address of connection involving the device,
  destination IP address of a connection involving the device, and
  one or more services utilized by the device.

16. The system of claim 11, wherein the machine learning model includes one or more of:
  a logistic regression model,
  a Support Vector Machine (SVM) model, and
  a random forest model.

17. The system of claim 1, wherein the one or more computing devices are configured to:
  store device data about the other IoT device in a database, wherein the device data indicates a classification of the other IoT device determined by the machine learning model.

18. The system of claim 1, wherein the one or more computing devices are configured to:
  retrain the machine learning model using additional labels of devices in the network and additional network activity data received from the network.

19. The method of claim 1, wherein the one or more computing devices are configured to:
  in response to the identifying of the other IoT device, elevate the other IoT device to a watch list for further monitoring.

20. One or more non-transitory computer-readable media storing program instructions that when executed on one or more processors cause the one or more processors to:
  receive network activity data associated with a plurality of devices in a network, including a first device labeled as an Internet-of-Things (IoT) device and a second device labeled as a non-IoT device;
  extract one or more features from the network activity data, wherein the one or more features are included in a training data set;
  provide the training data set including the one or more features as input to a machine learning model;
  train the machine learning model using the training data set to classify unlabeled devices as IoT or non-IoT devices;
  after the training, use the machine learning model to identify another device in the network as another IoT device; and
  in response to the identifying of the other IoT device;
    label the other IoT device with an IoT label, and autonomously apply one or more security measures to the other IoT device including banning the other IoT device from the network, isolating the other IoT device, or limiting data sent by the other IoT device.

* * * * *